United States Patent [19]

Nicholson

[11] 4,390,185
[45] Jun. 28, 1983

[54] GASKETS

[76] Inventor: Terence P. Nicholson, Calf Hall, Muggleswick, Derwentside, County Durham, England

[21] Appl. No.: 370,922

[22] Filed: Apr. 22, 1982

[30] Foreign Application Priority Data

May 1, 1981 [GB] United Kingdom ............... 8113497

[51] Int. Cl.³ .............................................. F16J 15/08
[52] U.S. Cl. ................................. 277/235 B; 277/236
[58] Field of Search .......................... 277/235 B, 236

[56] References Cited

U.S. PATENT DOCUMENTS

| 4,049,856 | 9/1977 | Adams | 277/235 B |
| 4,213,620 | 7/1980 | Kennedy | 277/235 B |
| 4,214,444 | 7/1980 | Fujioka et al. | 277/235 B |
| 4,300,779 | 11/1981 | Decore et al. | 277/235 B |

FOREIGN PATENT DOCUMENTS 2063386 6/1981 United Kingdom .
2064677 6/1981 United Kingdom .

Primary Examiner—Robert I. Smith
Attorney, Agent, or Firm—Murray Schaffer

[57] ABSTRACT

A gasket for sealing a joint between the cylinder block and the cylinder head of a wet liner internal combustion engine comprises a pair of outer metal plates (1) having outwardly directed corrugations formed therein away from cylinder bore openings. A composite metal spacer plate (2) is disposed between the plates (1) and has a central soft metal layer and hard metal surface layers bonded or integral therewith. Characteristically the metal spacer plate (2) extends into proximity with the individual cylinder bore openings and is formed adjacent these openings on each axial face with circumferential serrations (2a) of V-shaped radial profile; the thickness of the spacer plate measured over the peaks of the serrations before the gasket is installed is somewhat greater than that of the remainder of the spacer plate while the thickness measured between the troughs of the serrations is significantly less than that of the remainder of the spacer plate.

1 Claim, 4 Drawing Figures

GASKETS

In my co-pending British patent application No. 7941630 there is disclosed an improved gasket for sealing the joint between the cylinder block and the cylinder head of a wet liner internal combustion engine. This gasket comprises a pair of outer plates having outwardly directed corrugations formed therein away from cylinder bore openings and a composite metal spacer plate disposed between the two outer plates. The metal spacer plate comprises a central soft metal layer and hard metal surface layers and around each cylinder bore opening and between the outer metal plates is a metal washer formed on each axial face with circumferential serrations of V-shaped profile. The thickness of the washer measured over the peaks of the corrugations is somewhat greater than that of the spacer plate whereas the thickness measured between the troughs of the serrations is significantly less than that of the spacer plate.

A gasket having the above described construction and characteristic has proved to have a superb performance especially with wet liner engines which develop exceptionally high temperatures and gas pressures and its sole disadvantage is that it is unacceptably costly to produce for lower powered engines where price becomes of prime importance.

After research to discover an alternative but equally advantageous gasket which is less expensive to produce there has now been devised according to the invention a gasket of the kind defined above which is alternatively characterised in that instead of the serrated washer the metal spacer plate extends into proximity with the individual cylinder bore openings and is formed adjacent those bore openings on each axial face with circumferential serrations of V-shaped radial profile. Also, similarly to the previously disclosed gasket, the thickness of the spacer plate measured over the peaks of the serrations, before the gasket is installed, is somewhat greater than that of the remainder of the spacer plate whilst the thickness measured between the troughs of the serrations is significantly less than that of the remainder of the spacer plate.

A preferred gasket in accordance with the present invention is illustrated in the accompanying drawings, in which.

Figure 3:
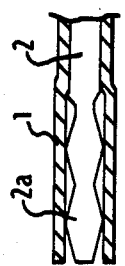
FIG. 3 is an enlarged section on line A—A of FIG. 2.

The gasket which is shown in the drawings is intended to seal the joint between the cylinder block and the cylinder head of V-8 compression ignition wet liner engine. The main part of this gasket is constructed in accordance with the disclosure of my co-pending British patent application 7940625.

Figure 4:
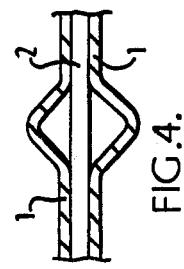
FIG. 4 is an enlarged section on line B—B of FIG. 2.
Figure 1:
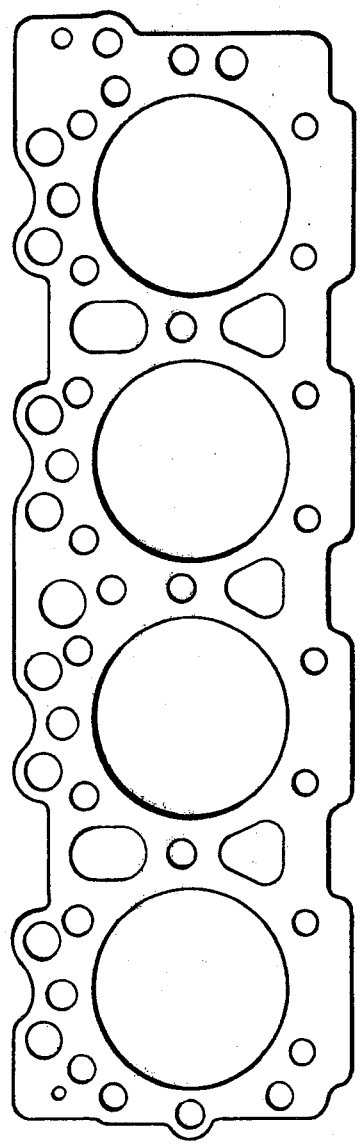
FIG. 1 is a general plan view of a cylinder head gasket to illustrate only the positions of cylinder bore, stud and cooling liquid openings required therein.

As shown most clearly in FIGS. 3 and 4 the gasket comprises two outer cold rolled mild steel bright annealed grade DSCR EN2 plates 1 each of 0.015 inches thickness and an interposed central composite spacer plate 2 which is 0.031 inches in thickness. This plate 2 is also of mild steel which has been bright annealed and softened. It has however been subjected to a skin rolling operation which has the effect of forming a hard metal layer on each of its surfaces. The gasket is coated overall with a 0.001 inch thick layer of copper. Apart from this the outer layer plates are each formed, as shown in FIG. 4, with a single outwardly directed corrugation which is of V-shaped profile. The path of this corrugation is illustrated in chain-dashed lines in FIG. 2, the chain lines being drawn at the peaks or locus points of the corrugations. The single wave has an overall width of 0.063 inches and a height, measured from the outer surface plane of the plate of 0.045 inches.

Figure 2:
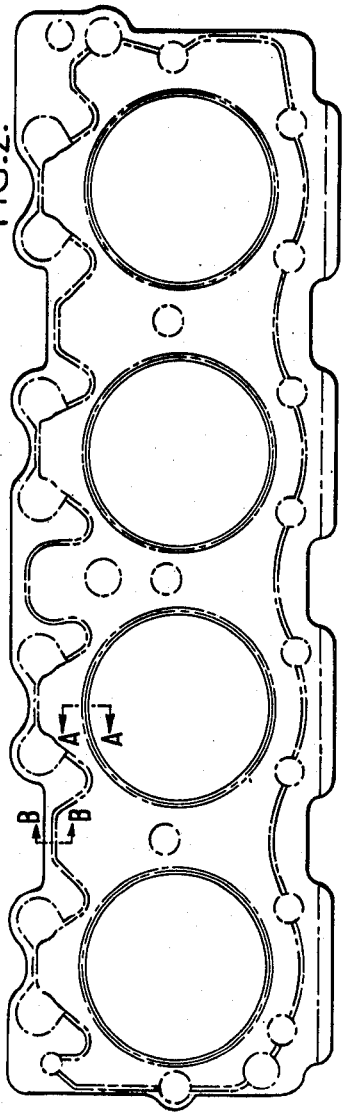
FIG. 2 is a detailed plan view of the gasket.

In order to understand how the gasket is adapted in order to ensure satisfactory gas tight sealing in the region of the four cylinder bores reference is now made to FIGS. 2 and 3.

Around each cylinder bore opening in the gasket for a radial distance sufficient to bridge a wet liner (not shown) and the adjacent margin of the cylinder block the spacer plate 2 is formed with annular serrations 2a on opposite sides.

The maximum thickness of this part of the spacer plate measured over the peaks of the serrations 2a somewhat exceeds the thickness of the remainder of the spacer plate, when the gasket as a whole is in an undeformed state thus ensuring high unit loading. The minimum thickness of the serrated part 2a of the spacer plate 2 is appreciably less than that of the remainder of the spacer plate thus allowing ample space for receiving surplus material which flows under clamping pressure. The serrations also contribute towards a labyrinth seal effect.

I claim:

1. A gasket for sealing a joint between the cylinder block and the cylinder head of a wet liner internal combustion engine comprising a pair of outer metal plates having outwardly directed corrugations formed therein away from cylinder bore openings and a composite metal spacer plate disposed between the two outer plates, the said spacer plate comprising a central soft metal layer and hard metal surface layers bonded or integral therewith and extending into proximity with the individual cylinder bore openings said metal spacer plate being formed adjacent these openings on each axial face with circumferential serrations of V-shaped radial profile, the thickness of the spacer plate measured over the peaks of the serrations, before the gasket is installed being somewhat greater than that of the remainder of the spacer plate whilst the thickness measured between the troughs of the serrations is significantly less than that of the remainder of the spacer plate.

* * * * *